United States Patent
Brown et al.

(10) Patent No.: US 7,116,874 B2
(45) Date of Patent: Oct. 3, 2006

(54) ENHANCED SUPERCONTINUUM GENERATION IN HIGHLY NONLINEAR FIBERS USING STRONG BRAGG GRATINGS

(75) Inventors: Thomas Brown, Rochester, NY (US); Kenneth S. Feder, Murray Hill, NJ (US); Yufeng Li, Rochester, NY (US); Jeffrey W. Nicholson, Chatham, NJ (US); Paul S. Westbrook, Bridgewater, NJ (US)

(73) Assignees: Fitel USA Corp., Norcross, GA (US); University of Rochester, Office of Technology Transfer, Rochester, NY (US)

( * ) Notice: Subject to any disclaimer, the term of this patent is extended or adjusted under 35 U.S.C. 154(b) by 32 days.

(21) Appl. No.: 11/063,380

(22) Filed: Feb. 22, 2005

(65) Prior Publication Data

US 2005/0226575 A1      Oct. 13, 2005

Related U.S. Application Data

(60) Provisional application No. 60/546,222, filed on Feb. 20, 2004.

(51) Int. Cl.
*G02B 6/00* (2006.01)
*H04J 14/02* (2006.01)

(52) U.S. Cl. .................. 385/122; 385/123; 385/37; 385/28; 398/81

(58) Field of Classification Search .......... 385/123, 385/122, 124, 28, 37, 50; 398/81
See application file for complete search history.

(56) References Cited

U.S. PATENT DOCUMENTS

| | | | |
|---|---|---|---|
| 5,945,666 A | 8/1999 | Kersey et al. | 250/227.14 |
| 5,960,146 A | 9/1999 | Okuno et al. | 385/122 |
| 5,999,671 A | 12/1999 | Jin et al. | 385/37 |
| 6,097,870 A | 8/2000 | Ranka et al. | 385/127 |
| 6,333,803 B1 | 12/2001 | Kurotori et al. | 359/188 |
| 6,381,391 B1 | 4/2002 | Islam et al. | 385/123 |
| 6,400,865 B1 | 6/2002 | Strasser et al. | 385/28 |
| 6,480,656 B1 | 11/2002 | Islam et al. | 385/123 |
| 6,529,303 B1 | 3/2003 | Rowan et al. | 359/128 |
| 6,529,676 B1 | 3/2003 | Eggleton et al. | 385/142 |
| 6,549,702 B1 | 4/2003 | Islam et al. | 385/31 |
| 6,603,910 B1 | 8/2003 | Islam et al. | 385/123 |
| 6,628,605 B1 | 9/2003 | Chang | 370/208 |
| 6,628,877 B1 | 9/2003 | Dugan et al. | 385/129 |
| 6,658,183 B1 | 12/2003 | Chandalia et al. | 385/48 |
| 6,665,497 B1 | 12/2003 | Hamilton-Gahart et al. | 385/147 |
| 6,671,444 B1 | 12/2003 | Arai et al. | 385/126 |
| 6,753,118 B1 | 6/2004 | Deshmukh et al. | 430/30 |
| 6,760,518 B1 | 7/2004 | Girardon et al. | 385/37 |
| 6,775,447 B1 | 8/2004 | Nicholson et al. | 385/122 |
| 6,813,423 B1 * | 11/2004 | Goto et al. | 385/122 |
| 6,816,649 B1 | 11/2004 | Ronnekleiv | 385/37 |

(Continued)

*Primary Examiner*—Brian M. Healy

(57) ABSTRACT

Enhancement of the supercontinuum generation performance of a highly-nonlinear optical fiber (HNLF) is accomplished by incorporating at least one Bragg grating structure in the HNLF. The Bragg grating results in reflecting a core-guided signal into signal which also remains core-guided. The supercontinuum radiation generated by such an arrangement will exhibit a substantial peak in its energy at the grating resonance of the Bragg grating and a region of increased radiation in a narrow wavelength band on the long wavelength side of the peak. A number of such Bragg gratings may be formed so as to "tailor" the enhancements provided in the supercontinuum radiation. Various, well-known Bragg grating modifications (tuning, chirped, blazed, etc.) may also be used in the inventive structure to enhance the generated supercontinuum.

56 Claims, 3 Drawing Sheets

U.S. PATENT DOCUMENTS

| | | | |
|---|---|---|---|
| 6,850,543 B1 | 2/2005 | Cundiff et al. | 372/18 |
| 6,915,053 B1* | 7/2005 | Hasegawa | 385/124 |
| 2003/0012502 A1 | 1/2003 | Riant et al. | 385/37 |
| 2003/0039462 A1 | 2/2003 | Boivin et al. | 385/147 |
| 2003/0174985 A1 | 9/2003 | Eggleton et al. | 385/125 |
| 2004/0032887 A1 | 2/2004 | Ahmadvond et al. | 372/21 |
| 2004/0037505 A1 | 2/2004 | Morin | 385/37 |
| 2004/0042500 A1 | 3/2004 | Christiansen | 370/509 |
| 2004/0148632 A1 | 7/2004 | Park et al. | 725/81 |
| 2004/0151467 A1 | 8/2004 | Ishikawa et al. | 385/144 |
| 2004/0228635 A1 | 11/2004 | Price | 398/149 |
| 2005/0002628 A1 | 1/2005 | Rahman et al. | 385/129 |
| 2005/0226575 A1* | 10/2005 | Brown et al. | 385/122 |

\* cited by examiner

ENHANCED SUPERCONTINUUM GENERATION IN HIGHLY NONLINEAR FIBERS USING STRONG BRAGG GRATINGS

CROSS-REFERENCE TO RELATED APPLICATION

This application claims the benefit of U.S. Provisional Application No. 60/546,222, filed Feb. 20, 2004.

TECHNICAL FIELD

The present invention relates to the field of supercontinuum generation and, more particularly, to an arrangement for generating supercontinuum radiation utilizing a highly nonlinear fiber (HNLF) that has been processed to include a strong fiber Bragg grating to generate a reflective response that dominates the fiber dispersion properties and provides enhancement of the supercontinuum radiation output from the HNLF.

BACKGROUND OF THE INVENTION

There are applications in the fiber optics field in which a high power, low noise, broadband light source is of particular interest. For example, efforts are now being made toward spectral slicing wherein a common light source is used to generate a multitude of wavelength division multiplexed (WDM) signals. Such an application thus has the potential for replacing many lasers with a single light source. Other applications include, but are not limited to, frequency metrology, device characterization, dispersion measurements made on specialty fibers, and the determination of transmission characteristics of gratings. All of these various diagnostic tools, as well as many other applications, may be greatly enhanced by the availability of such a broadband source.

In general, supercontinuum generation involves the launching of relatively high laser powers, typically in the form of optical pulses, into an optical fiber, waveguide or other microstructure, wherein the laser pulse train undergoes significant spectral broadening due to nonlinear interactions in the fiber. Current efforts at supercontinuum generation, typically performed using light pulses having durations on the order of picoseconds ($10^{-12}$ sec) in kilometer lengths of fiber, have unfortunately shown degradation of coherence in the generating process. In particular, additional noise has been found to be introduced into the system during the spectral broadening aspect of the process.

Supercontinuum light of wavelengths spanning more than one octave have been generated in microstructured and tapered optical fibers by launching light pulses having durations on the order of femtoseconds ($10^{-15}$ sec) into the ends of such microstructured or tapered fibers. The extreme spectra thus produced are useful, for example, in measuring and stabilizing pulse-to-pulse carrier envelope phase, as well as in high-precision optical frequency combs. Efforts at modeling the continuum in microstructured fibers based on a modified nonlinear Schrodinger equation have been aimed at understanding the fundamental processes involved in the spectrum generation, and show that coherence is better maintained as the launched pulses are shortened in duration from the order of picoseconds to femtoseconds.

A relatively new type of germanium-doped silica fiber with low dispersion slope and a small effective area, referred to hereinafter as "highly nonlinear fiber", or HNLF, has recently been developed. Although the nonlinear coefficients of HNLF are still smaller than those obtained with small core microstructured fibers, the coefficients are several times greater than those of standard transmission fibers, due to the small effective area of HNLF. Supercontinuum generation using an HNLF and a femtosecond fiber laser has been reported. U.S. Pat. No. 6,775,447 issued to J. W. Nicholson et al. on Aug. 10, 2004 discloses an HNLF supercontinuum source formed from a number of separate sections of HNLF fiber that have been fused together, each having a different dispersion value at the light source wavelength and an effective area between five and fifteen square microns. The concatenation of a number of different HNLF sections allows for the dispersion of the source to be modified, but the ability to reliably reproduce and manufacture such a fused fiber source may be problematic. Moreover, problems remain with respect to providing spectral shaping of the supercontinuum, where such shaping is dictated, at least in part, by the ability to design and fabricate a given fiber dispersion and nonlinearity.

SUMMARY OF THE INVENTION

The need remaining in the prior art is addressed by the present invention, which relates to the field of supercontinuum generation and, more particularly, to an arrangement for generating supercontinuum radiation utilizing a highly nonlinear fiber (HNLF) that has been modified to include a strong Bragg grating that reflects a propagating optical signal back into a core-guided mode so as to modify the dispersion of the arrangement and enhance the supercontinuum generated by the HNLF.

In accordance with the present invention, a section of HNLF is post-processed to include a strong Bragg grating that reflects a predetermined signal wavelength back along the HNLF as a core-guided mode. The Bragg grating inscribed into the HNLF has been found to influence the chromatic dispersion over a bandwidth much greater than the grating bandgap itself, thus providing the ability to greatly enhance the supercontinuum locally near the bandgap.

It is an advantage of the present invention that since fiber Bragg gratings are tunable (with respect to their center wavelength), their effect on the generated supercontinuum output can be altered by changing (tuning) the strength of the grating and/or changing its center wavelength. Conventional grating processes may be used to form an apodized grating, chirped grating or a blazed grating where fabrication processes may further be modified to adjust the reflectivity and/or group delay of the Bragg grating, where modification of these parameters may influence the characteristics of the back-reflected, core-guided mode and enhance the generated supercontinuum (in terms of, for example, bandwidth, envelope, center wavelength, noise factor, etc.). Moreover, a multiple number of separate Bragg gratings (each having a different center wavelength) may be written in the same section of HNLF, in accordance with the present invention, to provide for additional supercontinuum enhancements.

Other and further advantages and embodiments of the present invention will become apparent during the course of the following discussion and by reference to the accompanying drawings.

BRIEF DESCRIPTION OF THE DRAWINGS

Referring now to the drawings.

DETAILED DESCRIPTION

Supercontinuum generation in fibers is well known and has been demonstrated in numerous fiber waveguides. Nonlinear interactions in such fibers are greatly affected by fiber properties such as effective area ($A_{eff}$) and waveguide dispersion. Waveguide dispersion governs how quickly a launched pulse will spread in the time domain and, as a result, how quickly the peak power of the pulse will decrease as it propagates along the fiber. In addition, the peak intensity of the pulse will be larger for fibers with a smaller $A_{eff}$, and will determine the magnitude of the nonlinear interactions in the waveguide itself. However, as mentioned above, current supercontinua have limitations that are dictated by the dispersion and nonlinearity of the fiber. Various applications currently exist (for example, frequency metrology) that would greatly benefit by broadening the continuum. In particular, broadening the supercontinuum would allow for a smaller length of HNLF to span an octave for a given pump power. Other limitations in the currently available supercontinuum are associated with the shape of the spectrum, the wavelength range, noise figure, etc. Generally speaking, therefore, it would be desirable to find a way to "enhance" the supercontinuum generation in fibers, where the enhancement may take the form of one or more of these desirable characteristics.

Figure 1:
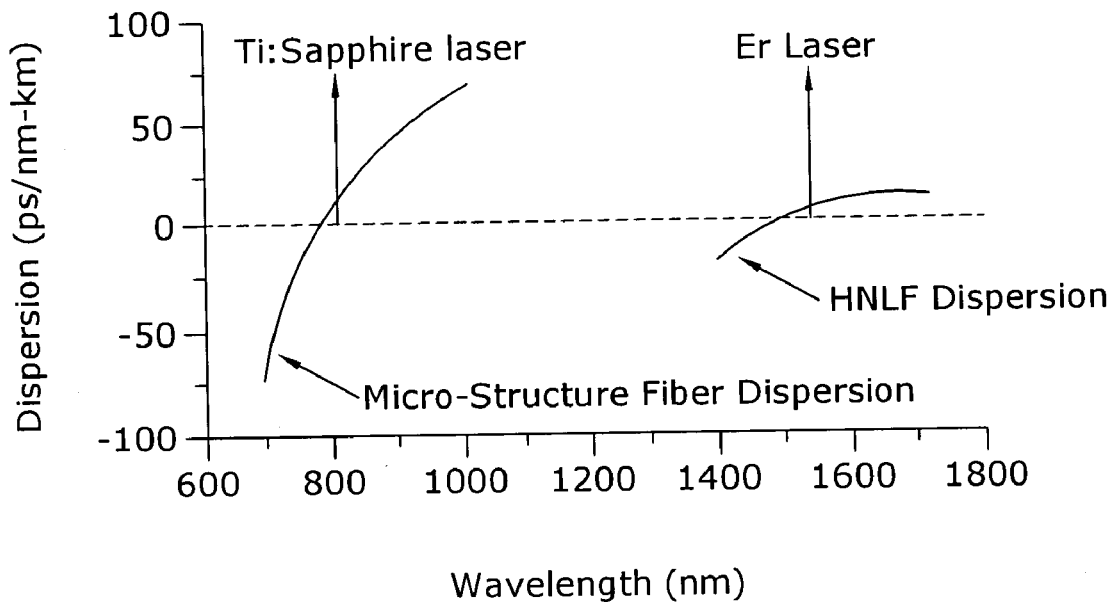
FIG. 1 contains a graph of fiber dispersion as a function of wavelength, illustrating the difference in dispersion for a microstructured fiber and a "highly-nonlinear" fiber (HNLF)

FIG. 1 contains a graph illustrating the relationship between the wavelength of a generating pulse and fiber dispersion for two different prior art supercontinuum-generating structures. The curve on the left is associated with using a Ti:sapphire laser as the pulse generating device in conjunction with an air-silica microstructured (or tapered) fiber. The curve on the right is associated with using an erbium laser source in conjunction with a section of highly-nonlinear fiber (HNLF). Numerical models show that the broadest continuum is generated when the wavelength of the laser light pulse is in the anomalous (positive) dispersion regime of the fiber. In particular, the pulse initially begins to self-Raman split to longer wavelengths; then, as higher-order solitons start to break up, parametric four-wave mixing causes frequencies to be generated at wavelengths shorter than the zero dispersion wavelength of the fiber, the combination resulting in the supercontinuum profile in the output power.

Comparing the two curves of FIG. 1, the curve associated with the HNLF is similar to that of the microstructured/tapered fiber, only shifted to longer wavelengths. Indeed, recent experiments with HNLF have shown supercontinuum generation at wavelengths of from 1.1 µm to 2.1 µm in only a few centimeters of HNLF. In accordance with the teachings of the present invention, as will be discussed in detail hereinbelow, it has been found that continuum generation in HNLF can be enhanced (for example, extended in bandwidth or improved in terms of spectral shaping) by modifying the fiber characteristics after fabrication. For example, UV exposure, electromagnetic field treatment and thermal processes may all modify the dispersion characteristics of HNLF in a manner that results in enhancing its supercontinuum output.

Supercontinuum generation in optical fibers depends on an interplay between nonlinear optical interactions and the linear dispersion of the fiber itself. Control of these dispersive properties has, to date, relied exclusively on the careful design and fabrication of an appropriate fiber waveguide, typically with very low dispersion, and a carefully-chosen zero dispersion wavelength value (in order to maintain a narrow pulse shape and provide appropriate phase matching). Applications operating in the near-infrared regions (approximately 800 nm to 1 micron) typically use a high-Δ microstructured fiber (or tapered fiber) in order to generate the desired supercontinuum (as evident from the Ti:sapphire graph of FIG. 1). The use of HNLF in supercontinuum generation has been designed, as indicated by the plot of FIG. 1, to operate in the mid-infrared region (around 1550 nm). The prior art has demonstrated that octave-spanning supercontinua can be generated in fibers only a few centimeters in length.

In accordance with the present invention, a section of HNLF is post-processed to be inscribed with at least one Bragg grating (using conventional grating-writing processes) to modify the generated radiation by having a core-guided, forward propagating mode reflected back into a core-guided mode. Bragg gratings (also referred to as refractive index gratings) have been used in association with optical waveguides for a number of years. A Bragg grating is a structure that has a periodic pattern of alternating high and low optical refractive index values. Conventionally, such gratings couple a forward-propagating core-guided mode at a predetermined wavelength in a single mode fiber (defined by the grating period) to the back-reflected core mode. Supercontinuum radiation generated by a Bragg grating/HNLF in accordance with the present invention results in the formation of an extended peak in the supercontinuum near the center wavelength of the grating, as well as enhanced light in a narrow band on the long wavelength side of the grating.

Figure 2:
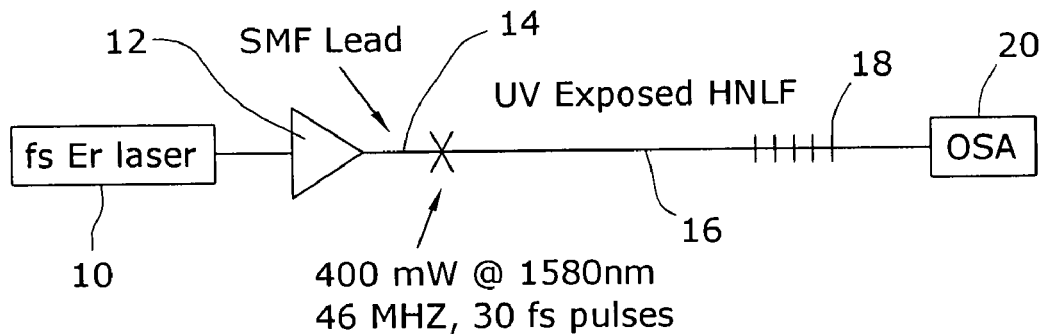
FIG. 2 illustrates an exemplary experimental arrangement used to observe the effects on generated supercontinuum for an HNLF that has been post-processed to include one or more Bragg gratings.

FIG. 2 illustrates an exemplary experimental arrangement used to observe the effects on generated supercontinuum for an HNLF that has been post-processed to include one or more Bragg gratings in accordance with the present invention. In this example, a femtosecond erbium laser source 10 is coupled through an amplifier 12 and propagates along a section of single mode fiber 14. A UV-exposed section 16 of HNLF including a Bragg grating 18 is spliced to single mode fiber 14, and the output is measured at an optical spectrum analyzer (OSA) 20. For one experiment, UV-exposed HNLF 16 comprised a 20 cm section of fiber that was loaded with deuterium to enhance its UV sensitivity. To create Bragg grating 18, the fiber was exposed to scanned, focused UV light at 242 nm from an excimer-pumped, frequency-doubled dye laser source through a phase mask having a period of 0.672 µm. The intensity of the beam was approximately 216 mJ/cm$^2$ per pulse, with the dose at each point on the fiber being approximately 3.4 kJ/cm$^2$. The Bragg grating was formed by a 22 mm uniform scan, with a reflectance at 990 nm. While Bragg grating 18 is shown in this embodiment as formed within HNLF 16, in an alternative embodiment a similar resonant structure may be formed at the termination of a section of HNLF, thus still providing the desired reflection back along the HNLF and supercontinuum generation in accordance with the present invention.

Figure 3:
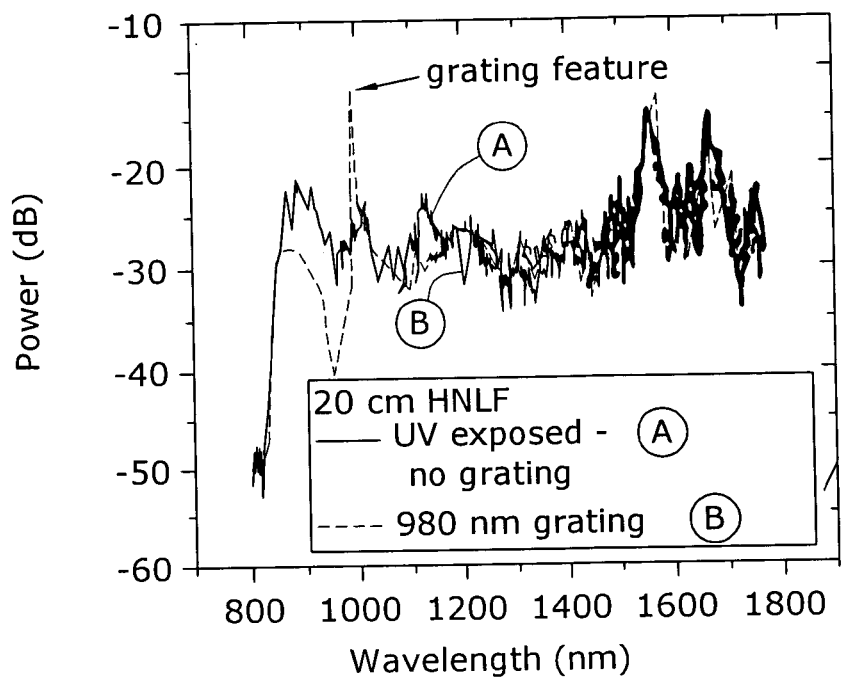
FIG. 3 contains a graph illustrating the generation of a peak in the supercontinuum radiation resulting from a Bragg grating structure.

FIG. 3 contains a graph (curve A) of the supercontinuum generated from a UV exposed fiber in the arrangement of FIG. 2, prior to the inscription of a Bragg grating in accordance with the present invention. Curve B illustrates the difference in supercontinuum generation associated with the incorporation of a Bragg grating in the UV-exposed HNLF structure. Each curve has a similar average refractive index change (with respect to a non-exposed HNLF fiber) and thus exhibits a similar waveguide dispersion characteristic. In accordance with the present invention, the inclusion of a Bragg grating structure in the HNLF results in generating a peak in supercontinuum radiation at the grating resonance (in this case, at 990 nm), with an additional large enhancement of the supercontinuum in the region on the long wavelength side of the grating resonance. The grating enhancement is illustrated as peak X on curve B, where peak X is shown as being approximately thirty times greater than the supercontinuum generated from a UV-exposed HNLF without a grating structure.

Figure 4:
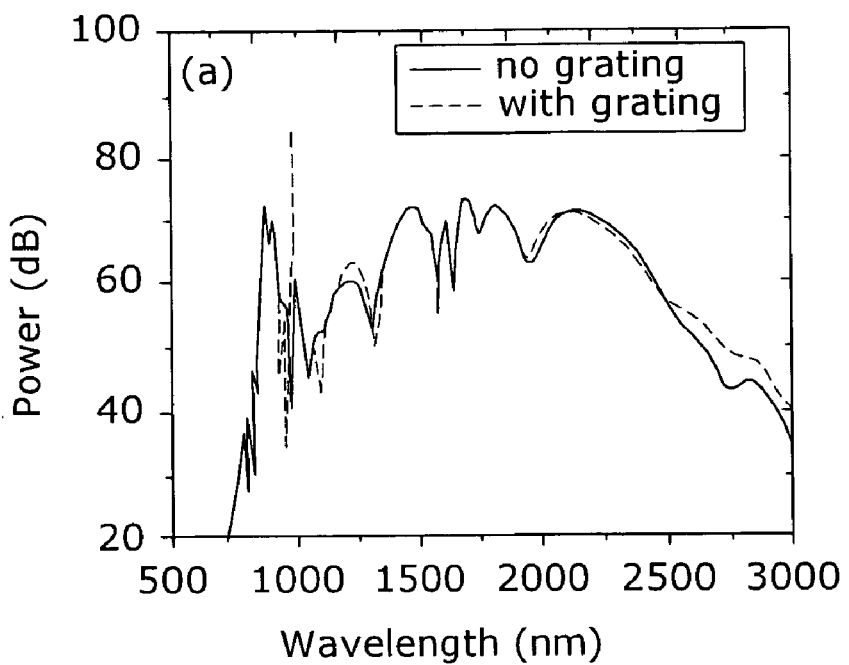
FIG. 4 contains simulated results of generated supercontinuum for various other Bragg grating resonant structures, with FIG. 4(a) illustrating the spectrum over the range of 500 to 3000 nm and FIG. 4(b) illustrating an enlarged view of the specific portion of the spectrum from 950 to 1020 nm.
Figure 4:
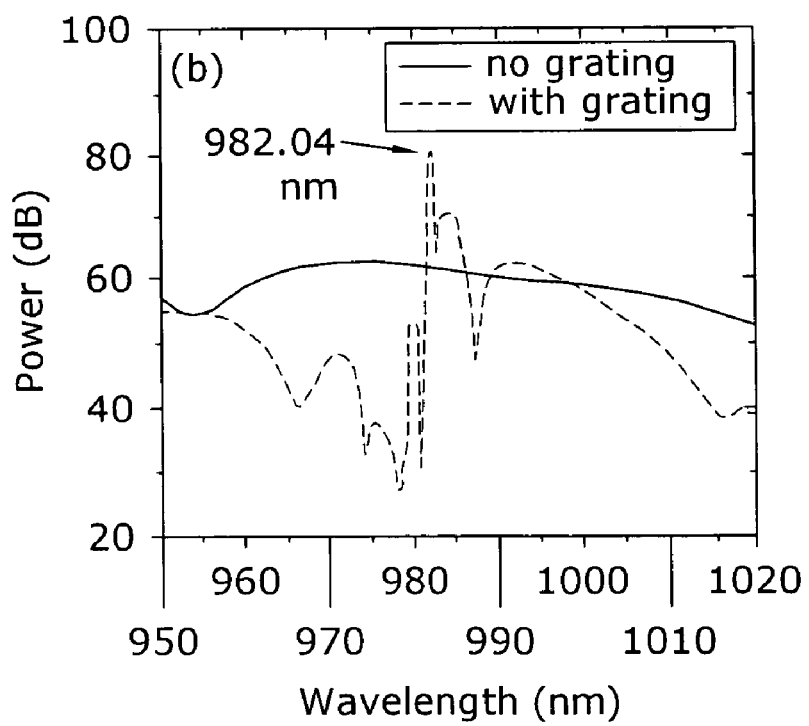

FIG. 4 contains simulation results for supercontinuum radiation generated in response to the resonant dispersion of a Bragg grating, with FIG. 4(a) showing the resultant continuum for an HNLF with a 980 nm grating (compared to a simulation result for an HNLF without a grating). FIG. 4(b) is an expanded view in the region of the grating resonance. Referring to FIG. 4(b), it is evident that a strong feature on the long wavelength side of the grating resonance is produced (compare with prior art curve) as a result of including a Bragg grating in the structure.

Figure 5:
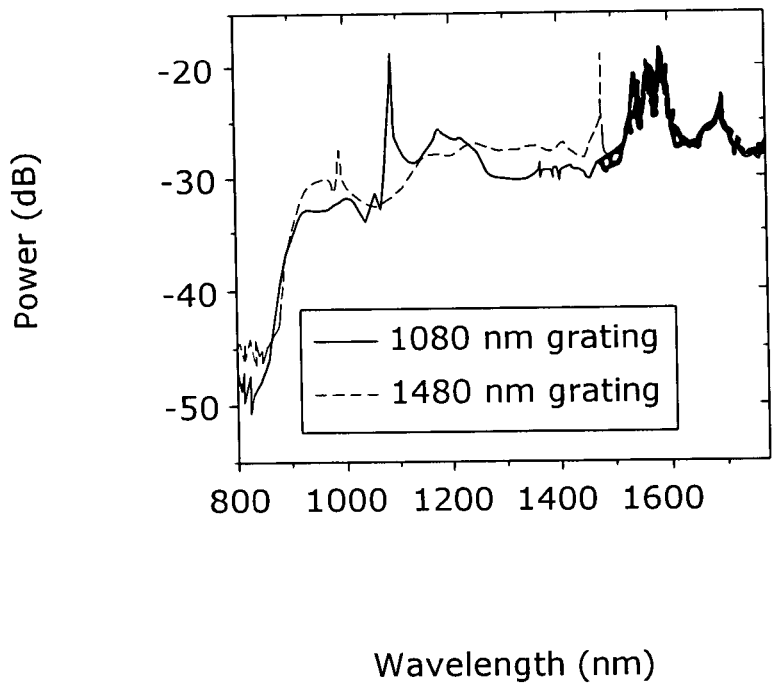
FIG. 5 contains a graph illustrating the generation of spectral peaks in different positions in the supercontinuum radiation.

Advantageously, well-known processing techniques can be used to form Bragg gratings with any desired grating resonance (for example, the period of the phase grating may be adjusted to change the grating resonance). Indeed, multiple Bragg gratings may be "written" into the same section of fiber (in this case HNLF) so as to form multiple resonant wavelengths. Bragg gratings with multiple resonances can also be fabricated by imposing a sampling function on a given grating structure. In particular, a sampling function (usually a periodic function) is a modulation of the basic grating index modulation and is usually longer in period than the basic grating modulation. The formation of a sampled grating structure results in forming many resonances that are spaced in wavelength by an amount that is inversely proportional to the sampling period. FIG. 5 illustrates a graph of experimental results for supercontinua produced by Bragg gratings with other center wavelengths, namely, 1080 nm and 1480 nm. As shown, the generated supercontinuum from such structures will experience an enhancement on the long wavelength side of each inscribed grating resonant wavelength. The possibility also exists, it should be noted, to generate enhancements on the short wavelength side of the resonance, or on both sides, for other grating and laser parameters.

It is to be noted that spectrum of light being generated by the HNLF can be monitored as the grating is being inscribed into the fiber. In this way, the spectrum may be trimmed, shifted or shaped to an optimum value, with desired noise reduction figures, through incorporating a feedback mechanism into the grating writing process. Moreover, various other well-known Bragg grating "features" may be incorporated into a grating formed in HNLF. That is, an apodized grating, blazed grating, chirped, etc. may easily be formed and the modifications in the grating structure used to enhance various aspects of the generated supercontinuum generation. Moreover, it is to be understood that various other highly-nonlinear waveguiding components, such as a microstructured fiber, may be processed to include the resonant features as discussed above. While the foregoing description represents a preferred embodiment of the present invention, it will be obvious to those skilled in the art that various modifications may be made without departing from the spirit and scope of the invention as pointed out by the following claims.

What is claimed is:

1. An optical waveguide suitable for generation of a supercontinuum spectrum at the output thereof when light at a certain wavelength from a light source is launched into an input thereof, the waveguide comprising
    at least one section of highly-nonlinear waveguide including at least one resonant structure that reflects at least one linearly propagating, core-guided mode at a resonant wavelength into a linearly propagating, back-reflected, core-guided mode, the resonant structure exhibiting a transmissive dispersion that is greater than the optical waveguide dispersion over at least a portion of the supercontinuum bandwidth.

2. An optical waveguide as defined in claim 1 wherein the at least one section of highly-nonlinear waveguide comprises at least one section of highly-nonlinear optical fiber.

3. An optical waveguide as defined in claim 1 wherein the at least one section of highly-nonlinear waveguide comprises at least one section of microstructured optical fiber.

4. An optical waveguide as defined in claim 1 wherein the at least one resonant structure is a tunable structure so as to adjust the associated resonant wavelength.

5. An optical waveguide as defined in claim 1 wherein the at least one section of highly-nonlinear waveguide comprises a plurality of separate resonant structures, each having a different resonant wavelength.

6. An optical waveguide as defined in claim 1 wherein the at least one resonant structure comprises at least one Bragg grating.

7. An optical waveguide as defined in claim 6 wherein the at least one Bragg grating includes at least one resonant wavelength within the generated supercontinuum.

8. An optical waveguide as defined in claim 7 wherein the at least one Bragg grating generates at least one peak in the supercontinuum radiation near the at least one resonant wavelength.

9. An optical waveguide as defined in claim 6 wherein the at least one Bragg grating is formed to exhibit increased supercontinuum generation on the long wavelength side of the generated supercontinuum radiation peak.

10. An optical waveguide as defined in claim 6 wherein the at least one Bragg grating comprises a chirped grating structure.

11. An optical waveguide as defined in claim 6 wherein the at least one Bragg grating comprises an apodized grating structure.

12. An optical waveguide as defined in claim 6 wherein the at least one Bragg grating comprises a blazed grating structure.

13. An optical waveguide as defined in claim 6 wherein the at least one Bragg grating exhibits more than one resonant wavelength.

14. An optical waveguide as defined in claim 13 wherein the at least one Bragg grating comprises a sampled Bragg grating structure.

15. An optical waveguide as defined in claim 1 wherein the at least one section of highly-nonlinear waveguide generates a reflection of at least 4% of the forward-directed linearly propagating, core-guided mode.

16. An optical waveguide as defined in claim 1 wherein the at least one resonant structure comprises at least one Fabry-Perot cavity.

17. An optical waveguide as defined in claim 16 wherein the at least one resonant structure comprises a plurality of Fabry-Perot cavities disposed long the at least one section of highly-nonlinear waveguide, each Fabry-Perot cavity exhibiting a different resonant wavelength.

18. An optical waveguide as defined in claim 1 wherein the at least one resonant structure comprises at least one fiber loop mirror.

19. An optical waveguide as defined in claim 18 wherein the at least one resonant structure comprises a plurality of fiber loop mirrors, each mirror exhibiting a different resonant wavelength.

20. A source of optical supercontinuum radiation, the source comprising
a source of light having a predetermined transmission wavelength and 3 dB bandwidth, and a known output power as a function of time;
at least one section of highly-nonlinear waveguide; and
at least one resonant structure disposed in relation to the at least one section of highly-nonlinear waveguide such that if a weak linearly propagating mode is incident on the at least one resonant structure at least one reflection is generated, the at least one resonant structure exhibiting a transmissive dispersion that is greater than the optical waveguide dispersion over at least a portion of the supercontinuum bandwidth.

21. A source of optical supercontinuum radiation as defined in claim 20 wherein at least one resonant structure is formed within the at least one section of highly-nonlinear waveguide.

22. A source of optical supercontinuum radiation as defined in claim 20 wherein at least one resonant structure is formed contiguous to a termination of the at least one section of highly-nonlinear waveguide.

23. A source of optical supercontinuum radiation as defined in claim 20 wherein the source of light provides an optical signal having a spectrum that does not overlap the reflection bandwidth of the resonant structure, where the output spectrum does overlap the resonant structure.

24. A source of optical supercontinuum radiation as defined in claim 20 wherein the supercontinuum spectrum is greater in bandwidth than the combined resonant structure reflection bandwidths.

25. A source of optical supercontinuum radiation as defined in claim 20 wherein the optical signal bandwidth more than doubles during propagating through the at least one resonant structure or the at least one highly-nonlinear waveguide.

26. A source of optical supercontinuum radiation as defined in claim 20 wherein the transmission wavelength of the source of light at the input of the resonant structure is substantially different from the resonant wavelength of the at least one resonant structure.

27. A source of optical supercontinuum radiation as defined in claim 20 wherein the at least one section of highly-nonlinear waveguide comprises at least one section of highly-nonlinear optical fiber.

28. A source of optical supercontinuum radiation as defined in claim 20 wherein the at least one section of highly-nonlinear waveguide comprises at least one section of microstructured optical fiber.

29. A source of optical supercontinuum radiation as defined in claim 20 wherein the at least one resonant structure of the at least one section of highly-nonlinear waveguide is a tunable structure so as to adjust the associated resonant wavelength.

30. A source of optical supercontinuum radiation as defined in claim 20 wherein the at least one section of highly-nonlinear waveguide comprises a plurality of separate resonant structures, each having a different resonant wavelength.

31. A source of optical supercontinuum radiation as defined in claim 20 wherein the at least one resonant structure comprises at least one Bragg grating.

32. A source of optical supercontinuum radiation as defined in claim 31 wherein the at least one Bragg grating includes at least one resonant wavelength within the generated supercontinuum.

33. A source of optical supercontinuum radiation as defined in claim 32 wherein the at least one Bragg grating generates at least one peak in the supercontinuum radiation near the at least one resonant wavelength.

34. A source of optical supercontinuum radiation as defined in claim 31 wherein the at least one Bragg grating is formed to exhibit increased supercontinuum generation on the long wavelength side of the generated supercontinuum radiation peak.

35. A source of optical supercontinuum radiation as defined in claim 31 wherein the at least one Bragg grating comprises a chirped grating structure.

36. A source of optical supercontinuum radiation as defined in claim 31 wherein the at least one Bragg grating comprises an apodized grating structure.

37. A source of optical supercontinuum radiation as defined in claim 31 wherein the at least one Bragg grating comprises a blazed grating structure.

38. A source of optical supercontinuum radiation as defined in claim 31 wherein the at least one Bragg grating exhibits more than one resonant wavelength.

39. A source of optical supercontinuum radiation as defined in claim 38 wherein the at least one Bragg grating comprises a sampled Bragg grating structure.

40. A source of optical supercontinuum radiation as defined in claim 20 wherein the at least one section of highly-nonlinear waveguide generates a reflection from the at least one resonant structure of at least 4% of the forward-directed linearly propagating, core-guided mode.

41. A source of optical supercontinuum radiation as defined in claim 20 wherein the at least one resonant structure comprises at least one Fabry-Perot cavity.

42. A source of optical supercontinuum radiation as defined in claim 41 wherein the at least one resonant structure comprises a plurality of Fabry-Perot cavities disposed long the section of highly-nonlinear waveguide, each Fabry-Perot cavity exhibiting a different resonant wavelength.

43. A source of optical supercontinuum radiation as defined in claim 41 wherein the at least one resonant structure comprises at least one fiber loop mirror.

44. A source of optical supercontinuum radiation as defined in claim 43 wherein the at least one resonant structure comprises a plurality of fiber loop mirrors, each mirror exhibiting a different resonant wavelength.

45. A method of enhancing the supercontinuum generation of a highly nonlinear optical waveguide, the method comprising the steps of:
   a) providing at least one section of highly-nonlinear optical waveguide;
   b) creating at least one resonant structure of a predetermined period in or adjacent to the highly nonlinear optical waveguide so as to provide for significant reflections of at least one linearly propagating, core-guided mode at a resonant wavelength into a linearly propagating, back-reflected, core-guided mode, the resonant structure exhibiting a transmissive dispersion that is greater than the optical waveguide dispersion over at least a portion of the supercontinuum bandwidth.

46. The method as defined in claim 45 wherein in performing step b), at least one Bragg grating is written into the at least one highly nonlinear optical waveguide.

47. The method as defined in claim 45 wherein in performing step b), the at least resonant structure is written to include at least one resonant wavelength within the generated supercontinuum.

48. The method as defined in claim 45 wherein in performing step b), the at least one resonant structure is written to generate at least one peak in the supercontinuum radiation near the at least one resonant wavelength.

49. The method as defined in claim 45 wherein in performing step b), the at least one resonant structure is written to exhibit increased supercontinuum generation on the long wavelength side of the generated supercontinuum radiation peak.

50. The method as defined in claim 46 wherein in performing step b), the at least one Bragg grating is written to comprise a chirped grating structure.

51. The method as defined in claim 46 wherein in performing step b), the at least one Bragg grating is written to comprise an apodized grating structure.

52. The method as defined in claim 46 wherein in performing step b), the at least one Bragg grating is written to comprise a blazed grating structure.

53. The method as defined in claim 46 wherein in performing step b), the at least one Bragg grating is written to comprise more than one resonant wavelength.

54. The method as defined in claim 53 wherein in performing step b), the at least one Bragg grating is written to comprise a sampled Bragg grating structure.

55. The method as defined in claim 45 wherein in performing step b), at least one Fabry-Perot resonator is written into the at least one highly nonlinear optical waveguide.

56. The method as defined in claim 45 wherein in performing step b), an optical test signal is coupled into the at least one section of highly nonlinear optical waveguide and a measured output signal is used as a feedback control signal for creating the at least one resonant structure.

* * * * *